United States Patent
Malik et al.

(10) Patent No.: US 6,434,026 B1
(45) Date of Patent: Aug. 13, 2002

(54) MULTIPLE OUTPUT POWER SUPPLY CIRCUIT

(75) Inventors: Randhir S. Malik, Cary; William Hemena, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/644,143

(22) Filed: Aug. 22, 2000

(51) Int. Cl.[7] .............................................. H02M 3/335
(52) U.S. Cl. .................................. 363/21.14; 363/21.18
(58) Field of Search ........................... 363/20, 21.01, 363/21.04, 21.06, 21.07, 21.12, 21.14, 21.15, 21.16, 21.18, 56.01, 56.09, 95, 97, 131

(56) References Cited

U.S. PATENT DOCUMENTS

| 4,275,341 A | 6/1981 | Huber et al. |
| 4,733,326 A | 3/1988 | Harsch et al. |
| 5,373,434 A * | 12/1994 | Malik .......................... 363/56 |
| 5,400,239 A * | 3/1995 | Caine ............................ 363/67 |
| 5,402,301 A | 3/1995 | Mori et al. |
| 5,818,704 A | 10/1998 | Martinez |
| 5,909,353 A | 6/1999 | Alberter et al. |
| 5,946,207 A | 8/1999 | Schoofs |

* cited by examiner

Primary Examiner—Matthew Nguyen
(74) Attorney, Agent, or Firm—Sawyer Law Group LLP

(57) ABSTRACT

A multiple output power supply circuit is disclosed. The power supply circuit comprises an input voltage wherein the input voltage is coupled to a driver and a transformer coupled to the input voltage wherein the transformer is coupled to at least one switch. The power supply circuit further comprises at least two rectifiers, each of the at least two rectifiers coupled to the transformer via a winding, each of the at least two rectifiers comprising at least one diode and a controlled switching device coupled in parallel. According to the present invention, the circuit in accordance with the present invention provides multiple power outputs in a substantially more efficient manner.

12 Claims, 4 Drawing Sheets

MULTIPLE OUTPUT POWER SUPPLY CIRCUIT

FIELD OF THE INVENTION

The present invention relates to generally to computer power supply systems and specifically to an improved multiple output power supply circuit.

BACKGROUND OF THE INVENTION

Many server computer systems utilize multiple output power supply circuits. FIG. 1 shows a conventional multiple output power supply circuit. The circuit comprises an input voltage 10, coupled to a first capacitor 14 and a transformer 18. The transformer 18 is coupled to a first diode 12, a switch 20 and two rectifiers 70, 80. The first rectifier 70 comprises a first winding 26, a MAGAMP core 24, a second diode 30, a third diode 32, a MAGAMP Driver 38, a first inductor 40, a first freewheeling diode 42, a second capacitor 50, a first resistor 58, a second resistor 60, and a first error amplifier 62. The second rectifier 80 comprises a second winding 28, a third diode 34, an optocoupler 36, a third resistor 37, a second inductor 44, a second freewheeling diode 46, a second error amplifier 48, a third capacitor 52, a fourth resistor 54, and a fifth resistor 56.

The first rectifier 70 is coupled to the transformer 18 via the first winding 26 wherein the first winding 26 is coupled to the MAGAMP core 24 and the first freewheeling diode 42. The MAGAMP core 24 is coupled to the second diode 30 and the third diode 32 wherein the third diode 32 is coupled to the first freewheeling diode 42. The second diode 30 is coupled to the MAGAMP Driver 38 wherein the MAGAMP Driver 38 is further coupled to the first error amplifier 62. The first freewheeling diode 42 is coupled the third diode 32 and to the first inductor 40 wherein the first inductor 40 is further coupled to the second capacitor 50. The second capacitor 50 is coupled to the first resistor 58 wherein the first resistor 58 is further coupled to the second resistor 60. The first and second resistors 58, 60 are coupled to the first error amplifier 62.

The second rectifier 80 is coupled to the transformer via the second winding 28 wherein the second winding 28 is coupled to the fourth diode 34 and the second freewheeling diode 46. The second freewheeling diode 46 is coupled to the second inductor 44 and the third capacitor 52. The switch 20 is coupled to a driver 16 wherein the driver 16 is coupled a pulse width modulator 22. The pulse width modulator 22 is coupled to the optocoupler 36 wherein the optocoupler 36 is coupled to the third resistor 37. The third resistor 37 is coupled to the second error amplifier 48 wherein the second error amplifier 48 is coupled to the third resistor 54 and the fourth resistor 56.

The input voltage 10 is switched on and off at a very high frequency via the primary winding 4-6 of transformer 18 and switch 20. The switch 20 is switched on and off by the pulse width modulator 22 and the driver 16. The primary energy is transformed to the rectifiers 70, 80 by means of the first and second windings 26, 28. Consequently, a main output voltage 66 is obtained by rectifying the switched voltage developed across the second winding 28 with the fourth diode 34 and the second freewheeling diode 46. The rectified voltage is then averaged by the second inductor 44 and the third capacitor 52 thereby producing the main output voltage 66. Furthermore, the main output voltage 66 is regulated by a feedback loop comprising the second error amplifier 48, the optocoupler 36 and the pulse width modulator 22.

Similarly, a second output voltage 64 is obtained by rectifying the switched voltage developed across the first winding 26 with the third diode 32 and the first freewheeling diode 42. The rectified voltage is then averaged by the first inductor 40 and the second capacitor 50 thereby producing the second output voltage 64. The second output voltage 64 is regulated by modulating the switched voltage developed across the first winding 26 with the MAGAMP core 24, the MAGAMP driver 38, and the first error amplifier 62.

The transformer 18 is chosen whereby the duty ratio of forward energy transfer is close to 25%. This is done to provide regulated outputs for 20 ms interruptions of the AC line voltage. Because the forward energy is transferred 25% of the time, the third diode 32 and the fourth diode 34 are conducting the current for 25% of the time. Consequently, the first freewheeling diode 42 and the second freewheeling diode 46 are conducting the current for the remaining 75% of the time. Because power is dissipated when the diodes are conducting current, power is dissipated for 75% of the time while the freewheeling diodes 42, 46 are conducting the current. This dissipation of power significantly reduces the overall efficiency of the conventional multiple output power supply circuit.

Accordingly, what is needed is a more efficient multiple output power supply circuit. The circuit should be simple, cost effective and capable of being easily adapted to current technology. The present invention addresses such a need.

SUMMARY OF THE INVENTION

A multiple output power supply circuit is disclosed. The power supply circuit comprises an input voltage wherein the input voltage is coupled to a driver and a transformer coupled to the input voltage wherein the transformer is coupled to at least one switch. The power supply circuit further comprises at least two rectifiers, each of the at least two rectifiers coupled to the transformer via a winding, each of the at least two rectifiers comprising at least one diode and a controlled switching device coupled in parallel.

According to the present invention, the circuit in accordance with the present invention provides multiple power outputs in a substantially more efficient manner.

DETAILED DESCRIPTION

The present invention relates to a multiple output power supply circuit. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The present invention provides for an improved multiple output power supply circuit. The multiple output power supply circuit in accordance with the present invention provides a means for controlling the current flow to each of the freewheeling diodes in the circuit. By controlling the current flow to the freewheeling diodes, the power dissipation of the circuit is substantially reduced. This substantial reduction in power dissipation results in a significant improvement in the overall efficiency of the multiple output circuit.

Figure 1:
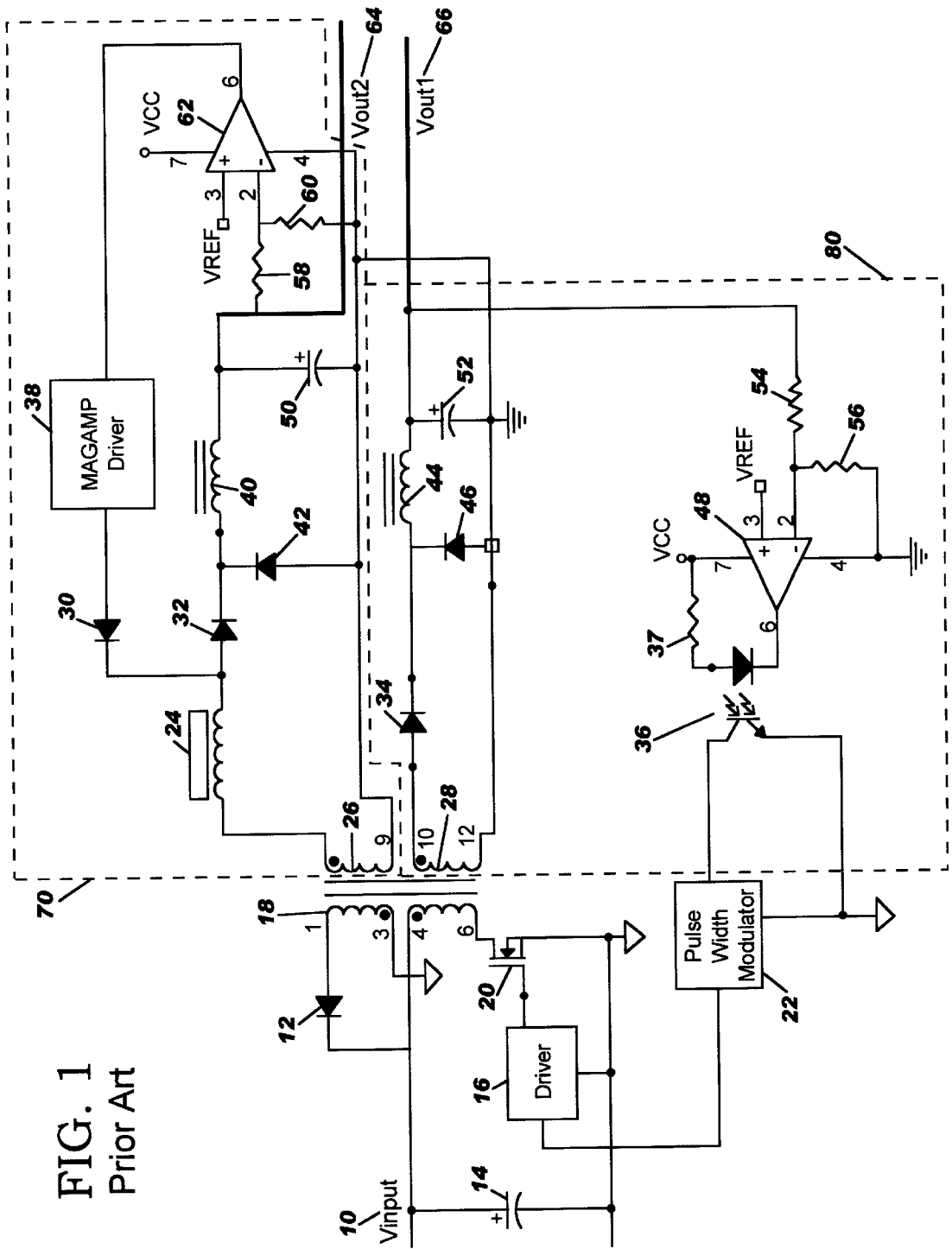
FIG. 1 is a typical multiple output power supply circuit.
Figure 2:
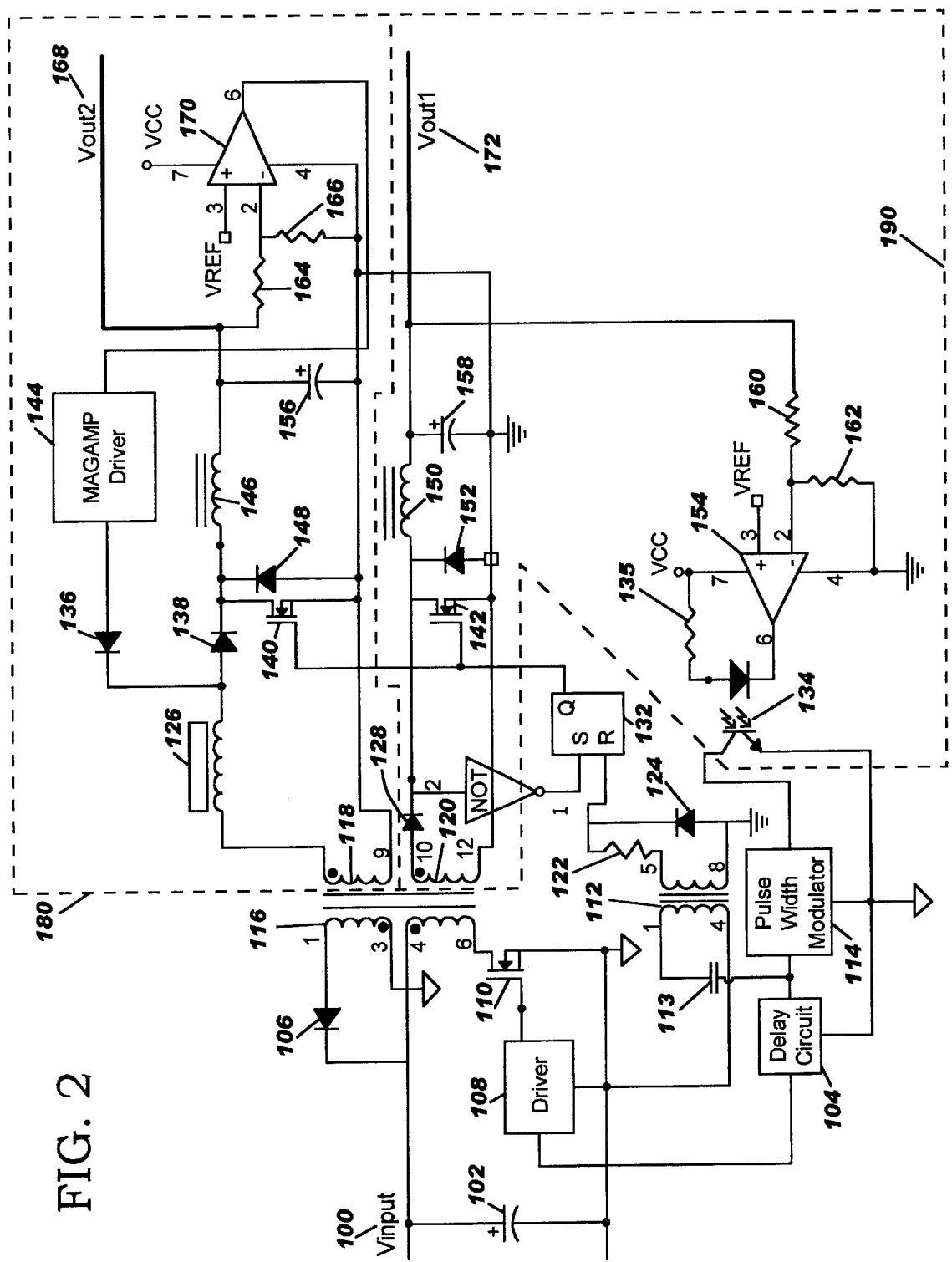
FIG. 2 is a multiple output power supply circuit in accordance with the present invention.

FIG. 2 shows a multiple output circuit in accordance with the present invention. The circuit comprises an input voltage 100, a first capacitor 102, a delay circuit 104, a first diode 106, driver 108, a signal transformer 112, a second capacitor 113, a pulse width modulator 114, a transformer 116, a first resistor 122, a second diode 124, a NOT circuit 130, a Set-Reset (SR) latch 132 and two rectifiers 180, 190.

The transformer 116 is coupled to the first diode 106, and the two rectifiers 180, 190. The first rectifier 180 comprises a first winding 118, a MAGAMP core 126, a third diode 136, a fourth diode 138, a first controlled switching device 140, a MAGAMP Driver 144, a first inductor 146, a first freewheeling diode 148, a third capacitor 156, a second resistor 164, a third resistor 166, and a first error amplifier 170. The second rectifier 190 comprises a second winding 120, a fifth diode 128, an optocoupler 134, a fourth resistor 135, a second controlled switching device 142, a second inductor 150, a second freewheeling diode 152, a second error amplifier 154, a fourth capacitor 158, a fifth resistor 160, and a sixth resistor 162. Preferably the first and second controlled switching devices 140, 142 comprise MOSFET devices.

The first rectifier 180 is coupled to the transformer 116 via the first winding 118 wherein the first winding 118 is coupled to the MAGAMP core 126 and the first MOSFET 140. The first MOSFET 140 is coupled in parallel to the first freewheeling diode 148 and to the fourth diode 138. The MAGAMP core 126 is coupled to the third diode 136 wherein the third diode 136 is coupled to the MAGAMP Driver 144. The MAGAMP Driver 144 is further coupled to the first error amplifier 170 wherein the first error amplifier is coupled to the second resistor 164 and the third resistor 166. The first freewheeling diode 148 is coupled to the first inductor 146 and the third capacitor 156 wherein the third capacitor 156 is coupled to the third resistor 166 and the first error amplifier 170.

The second rectifier 190 is coupled to the transformer 116 via the second winding 120 wherein the second winding 120 is coupled to the fifth diode 128 and a second MOSFET 142 wherein the second MOSFET 142 is coupled in parallel to the second freewheeling diode 152. The second freewheeling diode 152 is coupled to the second inductor 150 and the third capacitor 158. The fifth diode 128 is coupled to the NOT circuit 130 wherein the NOT circuit is coupled to the SR latch 132. The SR latch 132 is coupled to each of the MOSFETs 140, 142 and to the second diode 124. The second diode 124 is coupled to the first resistor 122 wherein the first resistor 122 is coupled to the signal transformer 112.

The switch 110 is coupled to the driver 108 wherein the driver 108 is coupled to the delay circuit 104. The delay circuit 104 is coupled to the pulse width modulator 114 wherein the pulse width modulator 114 is coupled to an optocoupler 134 and the second capacitor 113. The optocoupler 134 is coupled to the fourth resistor 135 and the second error amplifier 154 wherein the second error amplifier 154 is coupled to the fifth resistor 160 and the sixth resistor 162.

When the output of the pulse width modulator is high, the output of the pulse width modulator 114 is applied to the R node of the SR latch 132, via the signal transformer 112, to turn off MOSFETs 140, 142. The output of the pulse width modulator 114 also turns on the switch 110 via the driver 108. However, the delay circuit 104 is employed to delay the output of the pulse width modulator 114 to the switch 110 for a predetermined amount of time. Preferably, the output is delayed for 200–300 ns. This is done to ensure that the MOSFETs 140, 142 are turned off before the fourth diode 138 and the fifth diode 128 begin conducting current. Therefore, when the pulse width modulator 114 goes high, the SR latch 132 output goes low and turns off the MOSFETs 140,142.

When the output of the pulse width modulator 114 goes low, the switch 110 is turned off and each of the two windings 118 and 120 reverse polarity. The fourth diode 138 and the fifth diode 128 subsequently turn off and the freewheeling diodes 148, 152 are turned on. However, the freewheeling diodes 148, 152 will only conduct current for a few hundred nanoseconds. This is because when the fourth diode 138 and the fifth diode 128 are turned off, a low voltage is developed and inverted by the NOT circuit 130. This sets the S node of the SR latch 132 thereby turning on the MOSFETs 140, 142.

The current that was flowing through the freewheeling diodes 148, 152, now flows through the MOSFETs 140, 142. Because the resistance of the MOSFETs is preferably only a few milliohms whereas the voltage drop of the freewheeling diodes 148, 152 is approximately 500 millivolts, the power dissipation of the circuit is substantially reduced by allowing the current to flow through the MOSFETs 140, 142. This results in a significant improvement in the overall efficiency of the circuit.

Although the preferred embodiment of the present invention is described in the context of two outputs, one of ordinary skill in the art will readily recognize that the present invention can be utilized with many outputs while remaining within the spirit and scope of the present invention.

Figure 3:
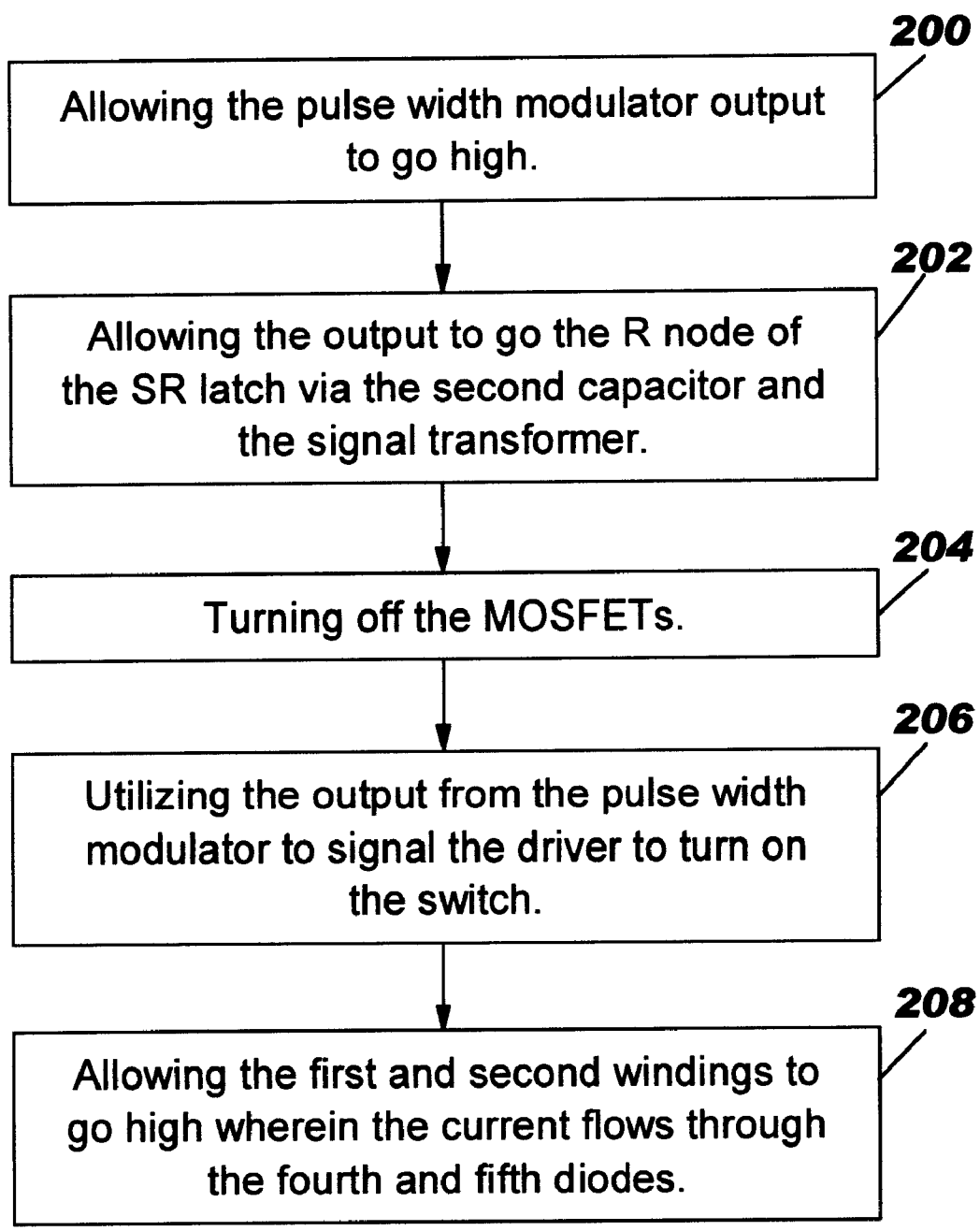
FIG. 3 is a flow diagram of the operation of the multiple output power supply circuit in accordance with the present invention when the pulse width modulator output goes high.

For a better understanding of the operation of the present invention, FIG. 3 is a flow diagram of the operation of the multiple output power supply circuit in accordance with the present invention when the pulse width modulator output goes high. Referring now to FIG. 2 and FIG. 3 together, first, the pulse width modulator 114 output goes high, via step 200. Next, the output goes to the R node of the SR latch 134 via the second capacitor 113 and the signal transformer 112, via step 202. MOSFETs 140, 142 are then turned off, via step 204. After a predetermined delay due to the delay circuit 104, the output from the pulse width modulator 114 signals the driver 108 to turn on the switch 110, via step 206. Preferably, the delay circuit 104 delays the output of the pulse width modulator 114 for approximately 200–300 ns. Once the switch 110 is turned on, the first and second windings 118, 120 go high and the current flows through the fourth and fifth diodes 138, 128, via step 208.

Figure 4:
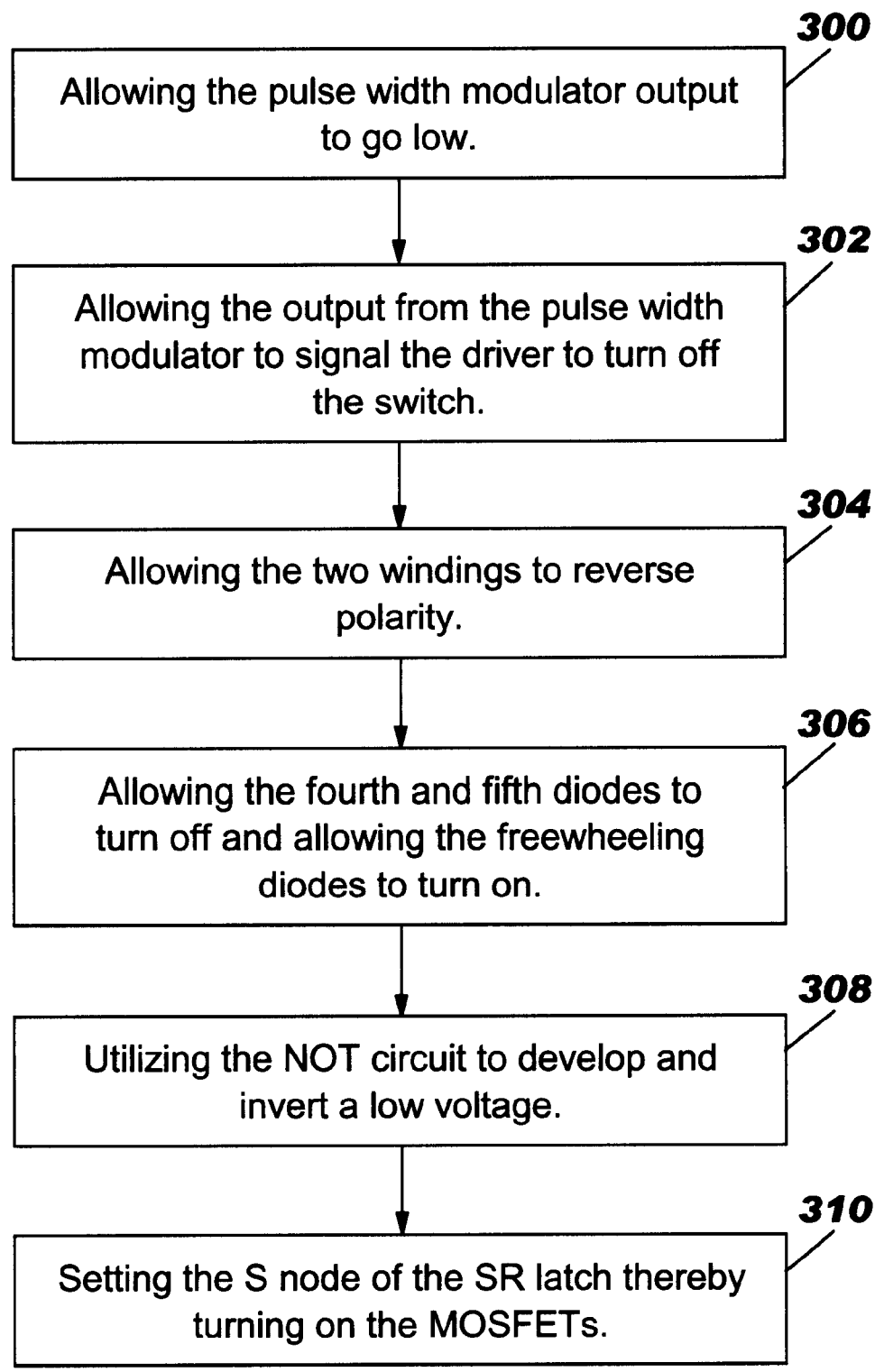
FIG. 4 is a flow diagram of the operation of the multiple output power supply circuit in accordance with the present invention when the pulse width modulator output goes low.

For a further understanding of the operation of the present invention, FIG. 4 is a flow diagram of the operation of the multiple output power supply circuit in accordance with the present invention when the pulse width modulator output goes low. Referring now to FIG. 2 and FIG. 4 together, first, the pulse width modulator 114 output goes low, via step 300. Next, the output from the pulse width modulator 114 signals the driver 108 to turn off the switch 110, via step 302. Once the switch 110 is turned off, the two windings 118, 120 reverse polarity, via step 304. The fourth and fifth diodes 138, 128 are then turned off and the freewheeling diodes 148, 152 are turned on, via step 306. A low voltage is then developed and inverted by the NOT circuit 130, via step 308. The S node of the SR latch 132 is then set thereby turning on the MOSFETs 140, 142, via step 310. The current that was flowing through the freewheeling diodes 148, 152, now flows through the MOSFETs 140, 142.

By allowing the current to flow through MOSFETs instead of freewheeling diodes, the power dissipation of the circuit is substantially reduced. This substantial reduction in power dissipation results in a significant improvement in the overall efficiency of the multiple output circuit is achieved.

Although the present invention has been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A multiple output power supply circuit comprising:
   an input voltage wherein the input voltage is coupled to a driver;
   a transformer coupled to the input voltage;
   at least one switch coupled to the transformer;
   at least two rectifiers, each of the at least two rectifiers coupled to the transformer via a winding, each of the at least two rectifiers comprising;
      at least one diode; and
      a controlled switching device coupled in parallel to the at least one diode for controlling a current flow to the at least one diode; and
   a Set-Reset latch coupled to the at least two rectifiers, wherein the Set-Reset latch controls an ON/OFF state of each controlled switching device in each of the at least two rectifiers.

2. The circuit of claim 1 wherein the Set-Reset latch is coupled to a signal transformer.

3. The circuit of claim 2 wherein the Set-Reset latch is coupled to a NOT circuit and the NOT circuit is coupled to one of the at least two rectifiers.

4. The circuit of claim 3 wherein the signal transformer is coupled to a pulse width modulator.

5. The circuit of claim 4 wherein the pulse width modulator is coupled to a delay circuit, the delay circuit delaying an output from pulse width modulator to the driver for a predetermined amount of time.

6. The circuit of claim 5 wherein the predetermined amount of time is between approximately 200 and 300 nanoseconds.

7. A multiple output power supply circuit comprising:
   an input voltage wherein the input voltage is coupled to a driver;
   a transformer coupled to the input voltage;
   at least one switch coupled to the transformer;
   at least two rectifiers, each of the at least two rectifiers coupled to the transformer via a winding, each of the at least two rectifiers comprising at least one diode and a controlled switching device coupled in parallel;
   a Set-Reset latch coupled to each of the controlled switching devices; and
   a signal transformer coupled to the Set-Reset latch, wherein the Set-Reset latch is coupled to a NOT circuit and the NOT circuit is coupled to one of the at least two rectifiers.

8. The circuit of claim 7 wherein the signal transformer is coupled to a pulse width modulator.

9. The circuit of claim 8 wherein the pulse width modulator is coupled to delay circuit, the delay circuit delaying an output from pulse width modulator to the driver for a predetermined amount of time.

10. The circuit of claim 9 wherein the predetermined amount of time is between approximate 200 and 300 nanoseconds.

11. A multiple output power supply circuit comprising:
    an input voltage wherein the input voltage is coupled to a driver;
    a transformer coupled to the input voltage;
    at least one switch coupled to the transformer;
    at least two rectifiers, each of the at least two rectifiers coupled to the transformer via a winding, each of the at least two rectifiers comprising at least one diode and a controlled switching device coupled in parallel;
    a Set-Reset latch coupled to each of the controlled switching devices;
    a NOT circuit coupled to the Set-Reset latch wherein the NOT circuit is further coupled to one of the at least two rectifiers;
    a signal transformer coupled to the Set-Reset latch;
    a pulse width modulator coupled to the signal transformer; and
    a delay circuit coupled to the pulse width delay circuit, the delay circuit delaying an output from pulse width modulator to the driver for a predetermined amount of time.

12. The circuit of claim 11 wherein the predetermined amount of time is between approximately 200 and 300 nanoseconds.

* * * * *